United States Patent
Chang et al.

(10) Patent No.: US 8,111,120 B2
(45) Date of Patent: Feb. 7, 2012

(54) ELECTRONIC DEVICE

(75) Inventors: Yuan-Te Chang, Taipei (TW); Chia-Hung Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 187 days.

(21) Appl. No.: 12/701,616

(22) Filed: Feb. 8, 2010

(65) Prior Publication Data

US 2010/0231337 A1 Sep. 16, 2010

(30) Foreign Application Priority Data

Mar. 16, 2009 (TW) .............................. 98108430 A

(51) Int. Cl.
*H01F 7/00* (2006.01)
(52) U.S. Cl. .................... 335/219; 361/679.55
(58) Field of Classification Search ............... 335/205, 335/219–220; 345/179; 361/147, 679.55
See application file for complete search history.

(56) References Cited

U.S. PATENT DOCUMENTS

| | | | |
|---|---|---|---|
| 6,366,440 B1 * | 4/2002 | Kung | 361/147 |
| 6,744,624 B2 * | 6/2004 | Siddiqui | 361/679.11 |
| 2004/0204202 A1 | 10/2004 | Shimamura et al. | |
| 2007/0067954 A1 | 3/2007 | Finney et al. | |
| 2008/0158800 A1 * | 7/2008 | Aoyagi | 361/681 |
| 2008/0223676 A1 | 9/2008 | Chuang | |

FOREIGN PATENT DOCUMENTS

CN 101035225 9/2007

* cited by examiner

*Primary Examiner* — Bernard Rojas
(74) *Attorney, Agent, or Firm* — Jianq Chyun IP Office

(57) ABSTRACT

An electronic device having two cases and a display module disposed therebetween is disclosed. Magnets are disposed at the two cases and the display module. When an acceleration sensed by a sensing unit of the electronic device is larger than a threshold value. The display module may be suspended via the magnetic repellent between the magnets disposed at the display module and the magnets disposed at two cases.

9 Claims, 4 Drawing Sheets

ELECTRONIC DEVICE

CROSS-REFERENCE TO RELATED APPLICATION

This application claims the priority benefit of Taiwan application serial no. 98108430, filed on Mar. 16, 2009. The entirety of the above-mentioned patent application is hereby incorporated by reference herein and made a part of specification.

BACKGROUND OF THE INVENTION

1. Field of the Invention

The invention relates to an electronic device and, more particularly, to an electronic device whose display module is protected from being struck by an external force easily.

2. Description of the Related Art

With the progress of the science and technology, electronic devices have a close relationship with people's daily life, and more and more electronic devices which are humanized and have good functions come out one after another. A display module is a rather important element for an electronic device, and once the display module is damaged, the electronic device cannot be operated. The current electronic device does not have any anti-strike design for the display module. Therefore, once the electronic device falls down or is struck by an external force, the display module may be damaged by the external force transferred from the case of the electronic device to the display module.

BRIEF SUMMARY OF THE INVENTION

The invention provides an electronic device whose display module may be prevented from being damaged due to strike.

An electronic device in the invention includes a first case, a second case, a plurality of first magnets, a plurality of electromagnets, a display module, a plurality of second magnets and a sensing unit. The second case is assembled to the first case to form accommodating room together, and the second case has an opening exposing the accommodating room. The first magnets are disposed at the first case, and the electromagnets are disposed at the second case. The display module is disposed at the accommodating room, and the opening exposes the display module. The second magnets are disposed at the display module correspondingly to the first magnets and the electromagnets. The sensing unit is electrically connected to the electromagnets. When an acceleration sensed by the sensing unit is larger than the threshold value, the sensing unit controls the electromagnets and the second magnets to repel each other magnetically to make the display module suspended.

In the electronic device in one embodiment, the electronic device further includes a pin module fixed at the accommodating room and electrically connected to the sensing unit. When the acceleration sensed by the sensing unit is less than the threshold value, the sensing unit controls the pin module to eject a plurality of pins to fix the display module. When the acceleration sensed by the sensing unit is larger than the threshold value, the sensing unit controls the pin module to withdraw the pins to make the display module suspended.

An electronic device in the invention includes a first case, a second case, a plurality of magnets, a plurality of second magnets, a display module, a plurality of third magnets, a pin module and a sensing unit. The second case is assembled to the first case to form an accommodating room together. The second case has an opening exposing the accommodating room. The first magnet is disposed at the first case, and the second magnet is disposed at the second case. The display module is disposed at an accommodating room, and the opening exposes the display module. The third magnets are disposed at the display module correspondingly to the first magnets and the second magnets, and the first magnets and the second magnets repel each other magnetically. The pin module is fixed at the accommodating room and electrically connected to the sensing unit. The sensing unit is electrically connected to the second magnets. When an acceleration sensed by the sensing unit is less than a threshold value, the sensing unit controls the pin module to eject a plurality of pins to fix the display module. When the acceleration sensed by the sensing unit is larger than the threshold value, the sensing unit controls the pin module to withdraw the pins to make the display module suspended.

In an embodiment of the two types of the electronic device, the display module includes a holder and a display panel. The second magnets and the display panel are disposed at the holder, and the opening of the second case exposes the display panel.

In one embodiment of the electronic device in the invention, the electronic device further includes a plurality of cushions disposed at the accommodating room and located around the display module.

In one embodiment of the electronic device in the invention, the electronic device further includes an input module pivotally connected to the first case or the second case.

In an electronic device in the invention, when the acceleration sensed by the sensing unit is larger than the threshold value, the display module may be suspended. Therefore, the display module may be prevented from being damaged due to a strike.

These and other features, aspects and advantages of the present invention will become better understood with regard to the following description, appended claims, and accompanying drawings.

DETAILED DESCRIPTION OF THE EMBODIMENT

Figure 1:
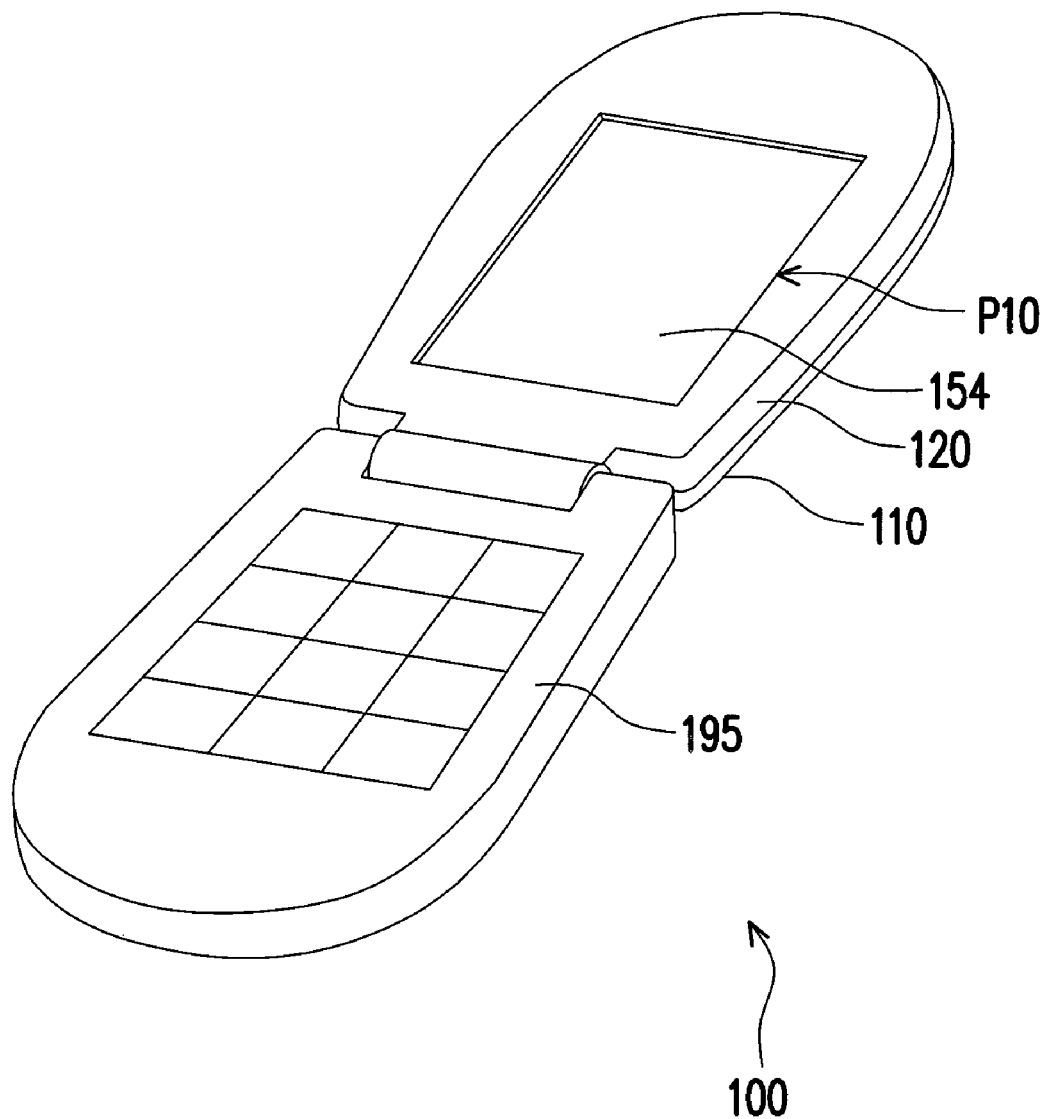
FIG. 1 is a schematic diagram showing an electronic device in an embodiment of the invention.
Figure 2:
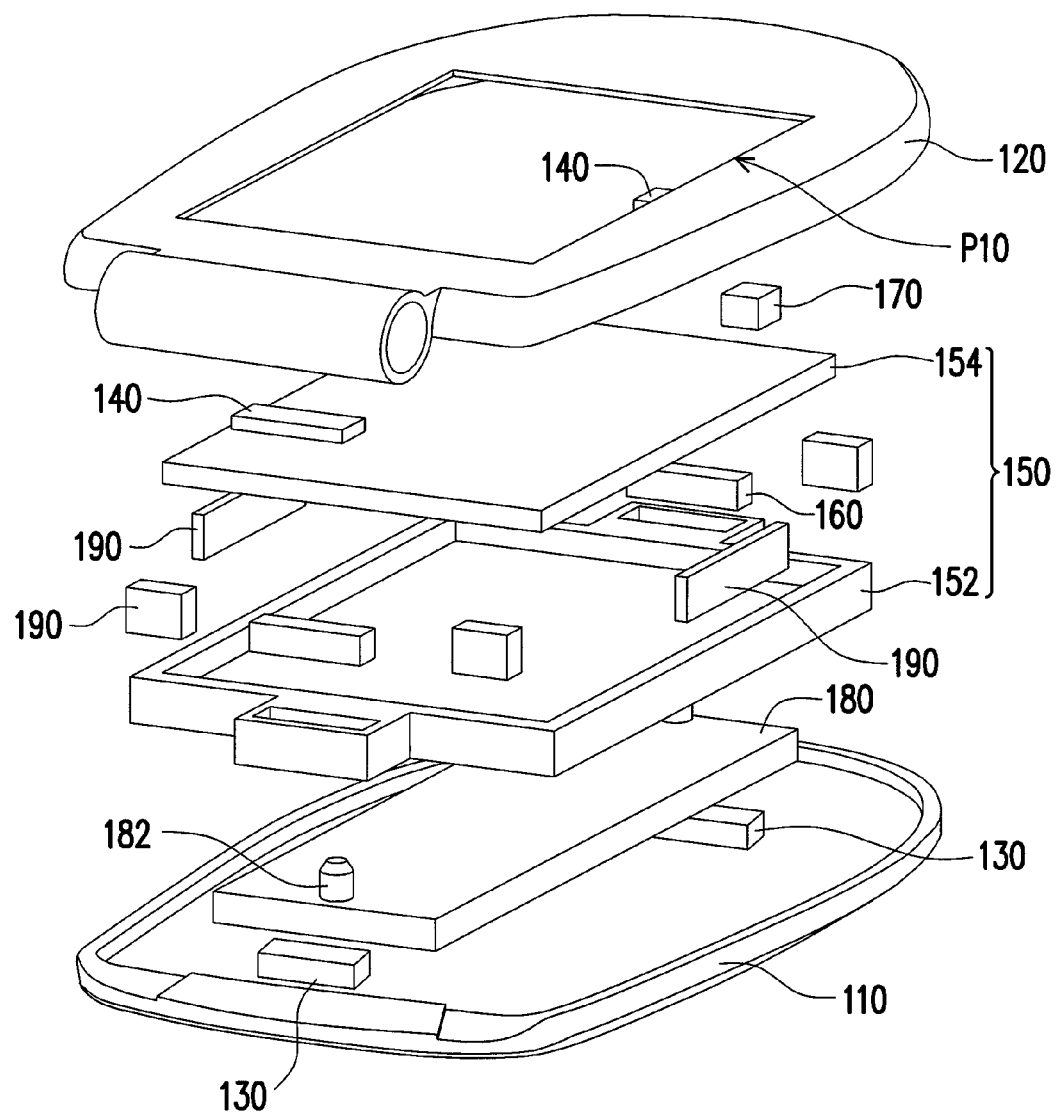
FIG. 2 is a partial exploded diagram showing the electronic device in FIG. 1.

FIG. 1 is a schematic diagram showing an electronic device according to an embodiment of the invention. FIG. 2 is a partial exploded diagram showing an electronic device in FIG. 1.

As shown in FIG. 1 and FIG. 2, the electronic device 100 in the embodiment includes a first case 110, a second case 120, a plurality of first magnets 130, a plurality of electromagnets 140, a display module 150, a plurality of second magnets 160 and a sensing unit 170. The electronic device 100 in the embodiment is, for example, a mobile phone, but it also may be other electronic device such as a notebook computer.

In addition, the electronic device 100 in the embodiment further includes an input module 195 pivotally connected to a first case 110 or a second case 120. However, the electronic device 100 also may be a bar-type phone, a tablet or other electronic device without a pivotal connecting mechanism.

Figure 3:
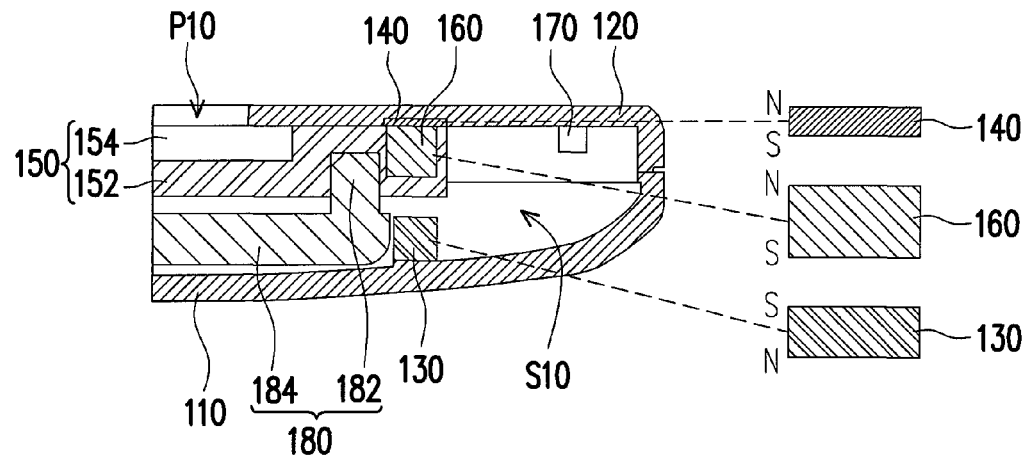
FIG. 3 and FIG. 4 are partial exploded diagrams showing the electronic device in FIG. 1 in different states.
Figure 4:
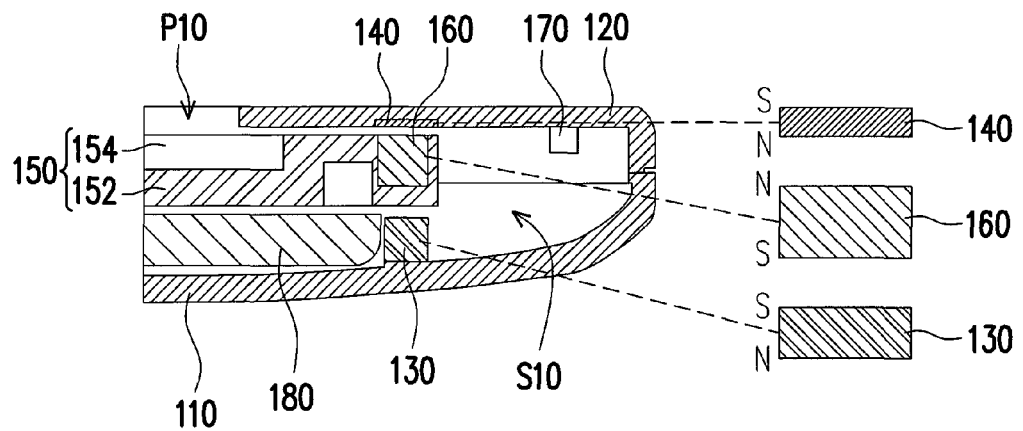

FIG. 3 and FIG. 4 are partial sectional diagrams showing the electronic device in FIG. 1 in different states. As shown in FIG. 2 and FIG. 3, the first case 110 and the second case 120 are assembled together to form an accommodating room S10, and the second case 120 has an opening P10 exposing the accommodating room S10. The first magnets 130 are disposed at the first case 110, and the electromagnets are disposed at the second case 120. The display module 150 is disposed at the accommodating room S10, and the opening P10 exposes the display module 150. The second magnets 160 are disposed at the display module 150, and the first magnets 130 and the electromagnets 140 are located at the upper side and lower side of the second magnets 160. Herein, the second magnets 160 and the first magnets 130 repel each other magnetically. The sensing unit 170 is electrically connected to the electromagnets 140.

In addition, the display module 150 in the embodiment includes a holder 152 and a display panel 154. The second magnets 160 and the display panel 154 are disposed at the holder 152, and the opening P10 of the second case 120 exposes the display panel 154. The display panel 154 is, for example, a liquid display panel, an organic electro-luminance display panel or other display panel. The electronic device 100 in the embodiment may include a plurality of cushions 190 disposed in the accommodating room S10 and around the display module 150 to provide proper buffer for the display module 150. The cushions 190 are, for example, elastic foam or other cushion.

As shown in FIG. 3, when an acceleration sensed by the sensing unit 170 is less than a threshold value, the sensing unit 170 controls the electromagnets 140 and second magnets 160 to attract each other magnetically to fix the display module 150. The right part of FIG. 3 shows a magnetic pole layout for the first magnets 130, the electromagnets 140 and the second magnets, but the invention is not limited thereto. In detail, when the electronic device 100 is in a normal use state, the acceleration sensed by the sensing unit 170 is less than the threshold value. Thus, the display module 150 may be fixed to the second case 120 via the magnetic attraction between the electromagnets 140 and the second magnets 160.

The electronic device 100 in the embodiment further includes a pin module 180 fixed in the accommodating room S10 and electrically connected to the sensing unit 170. In detail, the pin module 180 may be fixed to the first case 110 or the second case 120. When the acceleration sensed by the sensing unit 170 is less than the threshold value, the sensing unit 170 controls the pin module 180 to eject a plurality of pins 182 to fix the display module 150. Thus, the display module 150 may be fixed more preferably. Herein, the pin module 180 is realized by ejecting all pins 182 from a single body 184, but the pin module 180 also may include a plurality of independent bodies with pins 182.

As shown in FIG. 4, when the acceleration sensed by the sensing unit 170 is larger than the threshold value, the sensing unit 170 controls the electromagnets 140 and the second magnets 160 to repel each other via magnetic force to make the display module 150 suspended. The right part of FIG. 4 shows a magnetic pole layout way for the first magnets 130, the electromagnets 140 and the second magnets, which is taken as an example, and the invention is not limited thereto. In detail, when the electronic device 100 falls down, or it is struck by an external force or is in an abnormal use state, the acceleration sensed by the sensing unit 170 is larger than the threshold value. The display module 150 may be suspended and does not contact the first case 110 or the second case 120 via the magnetic repellent between the electromagnets 140 and the second magnets 160 and the magnetic repellent between the second magnets 160 and the first magnets 130. Thus, the striking force applied to the first case 110 or the second case 120 is not transferred to the display module 150. Thus, the display module 150 is prevented from being damaged. After the electronic device 100 is restored to a normal use state, the display module 150 may be fixed to the second case again.

In detail, after the electronic device 100 is restored to a normal use state, the sensing unit 170 controls the electromagnets 140 and the second magnets 160 to magnetically attract each other again to fix the display module 150 to the second case 120 for users to operate normally. When the electronic device 100 is disposed with a pin module 180, the sensing unit 170 may control the pin module 180 to fix the display module 150 after the electronic device is restored to the normal use state. That is, the pin module 180 may eject a plurality of pins 182 to fix the display module 150 again to provide a good fixing effect for the display module 150 again.

In addition, when the acceleration sensed by the sensing unit 170 is larger than the threshold value, the sensing unit 170 controls the pin module 180 to withdraw the pins 182 to make the display module 150 suspended.

Figure 5:
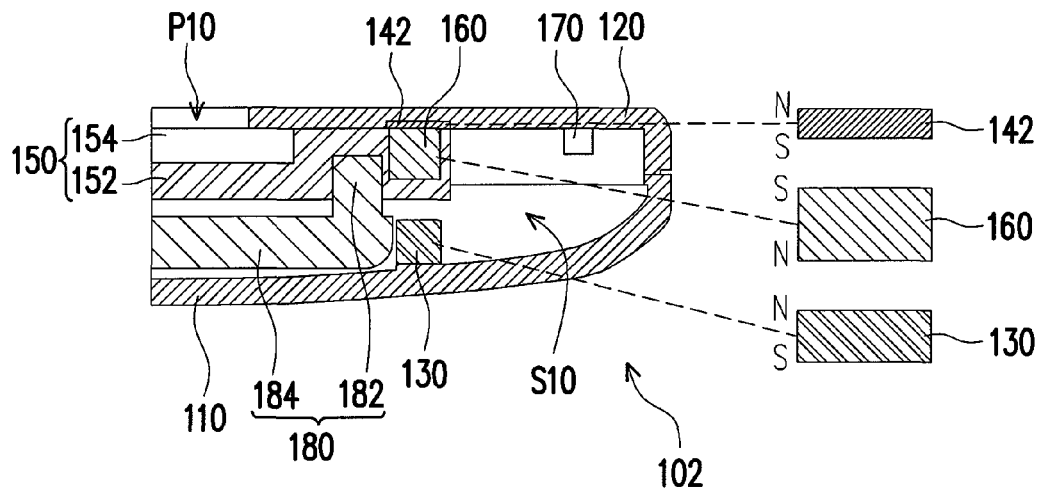
FIG. 5 and FIG. 6 are partial sectional diagrams showing the electronic device in another embodiment in different states.
Figure 6:
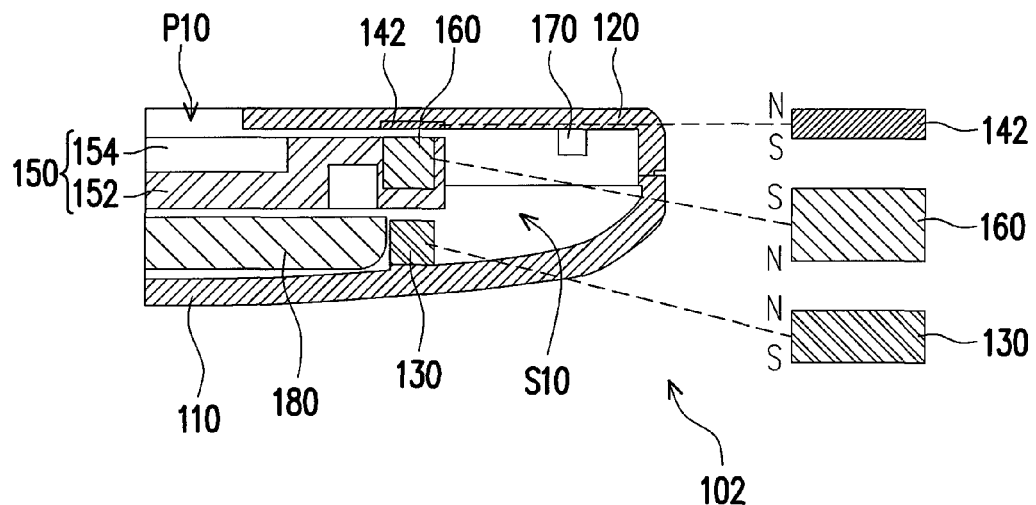

FIG. 5 and FIG. 6 are partial sectional diagrams showing the electronic device in another embodiment in different states. As shown in FIG. 5, the electronic device 102 in the embodiment is similar to the electronic device 100 in FIG. 1, and only the difference is described hereinbelow. In this embodiment, the magnets 142 disposed at the second case are not limited to the electromagnets. When the acceleration sensed by the sensing unit 170 is less than the threshold value, the sensing unit 170 controls the pin module 180 to eject the pins 182 to fix the display module 150. In detail, when the electronic device 102 is in a common use state, the acceleration sensed by the sensing unit 170 is less than a threshold value, and the pins 182 are ejected and propped against the display module 150. The display module 150 may be fixed to the second case 120 via the pin module 180.

As shown in FIG. 6, when the electronic device 102 falls down, is struck by an external force or in other abnormal use state, the acceleration sensed by the sensing unit 170 is larger than the threshold value, the sensing unit 170 controls the pins 182 to be withdrawn, and pins 182 are not propped against the display module 150 any more. Therefore, the display module 150 may be suspended and does not contact the first case 110 and the second case 120 via the magnetic repellent between the electromagnets 142 and the second magnets 160 and the magnetic repellent between the second magnets 160 and the first magnets 130.

To sum up, in the electronic device in the invention, when the acceleration sensed by the sensing unit is less than the threshold value, the display module may be fixed via the magnetic attraction or the pins. In addition, when the acceleration sensed by the sensing unit is larger than the threshold value, the display module may be suspended via the magnetic repellent. Thus, the display module may be prevented from being damaged due to the strike. Therefore, the electronic device in the invention is not damaged easily.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
a first case;
a second case assembled to the first case to form an accommodating room together, the second case having an opening exposing the accommodating room;
a plurality of first magnets disposed at the first case;
a plurality of electromagnets disposed at the second case;
a display module disposed at the accommodating room, wherein the opening exposes the display module;
a plurality of second magnets disposed at the display module correspondingly to the first magnets and the electromagnets; and
a sensing unit electrically connected to the electromagnets, wherein when an acceleration sensed by the sensing unit is less than a threshold value, the sensing unit controls the electromagnets and the second magnets to attract each other magnetically to fix the display module, and when the acceleration sensed by the sensing unit is larger than the threshold value, the sensing unit controls the electromagnets and the second magnets to repel each other magnetically to make the display module suspended.

2. The electronic device according to claim 1, further comprising a pin module, fixed at the accommodating room and electrically connected to the sensing unit, wherein when the acceleration sensed by the sensing unit is less than the threshold value, the sensing unit controls the pin module to eject a plurality of pins to fix the display module, and when the acceleration sensed by the sensing unit is larger than the threshold value, the sensing unit controls the pin module to withdraw the pins to make the display module suspended.

3. The electronic device according to claim 1, wherein the display module comprises:
a holder, wherein the second magnets are disposed at the holder; and
a display panel disposed at the holder, wherein the opening exposes the display panel.

4. The electronic device according to claim 1, further comprising a plurality of cushions disposed at the accommodating room and located around the display module.

5. The electronic device according to claim 1, further comprising an input module pivotally connected to the first case or the second case.

6. An electronic device comprising:
a first case;
a second case assembled to the first case to form an accommodating room together, the second case having an opening exposing the accommodating room;
a plurality of first magnets disposed at the first case;
a plurality of second magnets disposed at the second case;
a display module disposed at the accommodating room, wherein the opening exposes the display module;
a plurality of third magnets disposed at the display module correspondingly to the first magnets and the second magnets, wherein the third magnets repel the first magnets and the second magnets magnetically;
a pin module fixed at the accommodating room and electrically connected to a sensing unit; and
a sensing unit electrically connected to the second magnets, wherein when an acceleration sensed by the sensing unit is less than a threshold value, the sensing unit controls the pin module to eject a plurality of pins to fix the display module, and when the acceleration sensed by the sensing unit is larger than the threshold value, the sensing unit controls the pin module to withdraw the pins to make the display module suspended.

7. The electronic device according to claim 6, wherein the display module comprises:
a holder, wherein the third magnets are disposed at the holder; and
a display panel disposed at the holder, wherein the opening exposes the display panel.

8. The electronic device according to claim 6, further comprising a plurality of cushions disposed at the accommodating room and located around the display module.

9. The electronic device according to claim 6, further comprising an input module pivotally connected to the first case and the second case.

* * * * *